Figure 1:
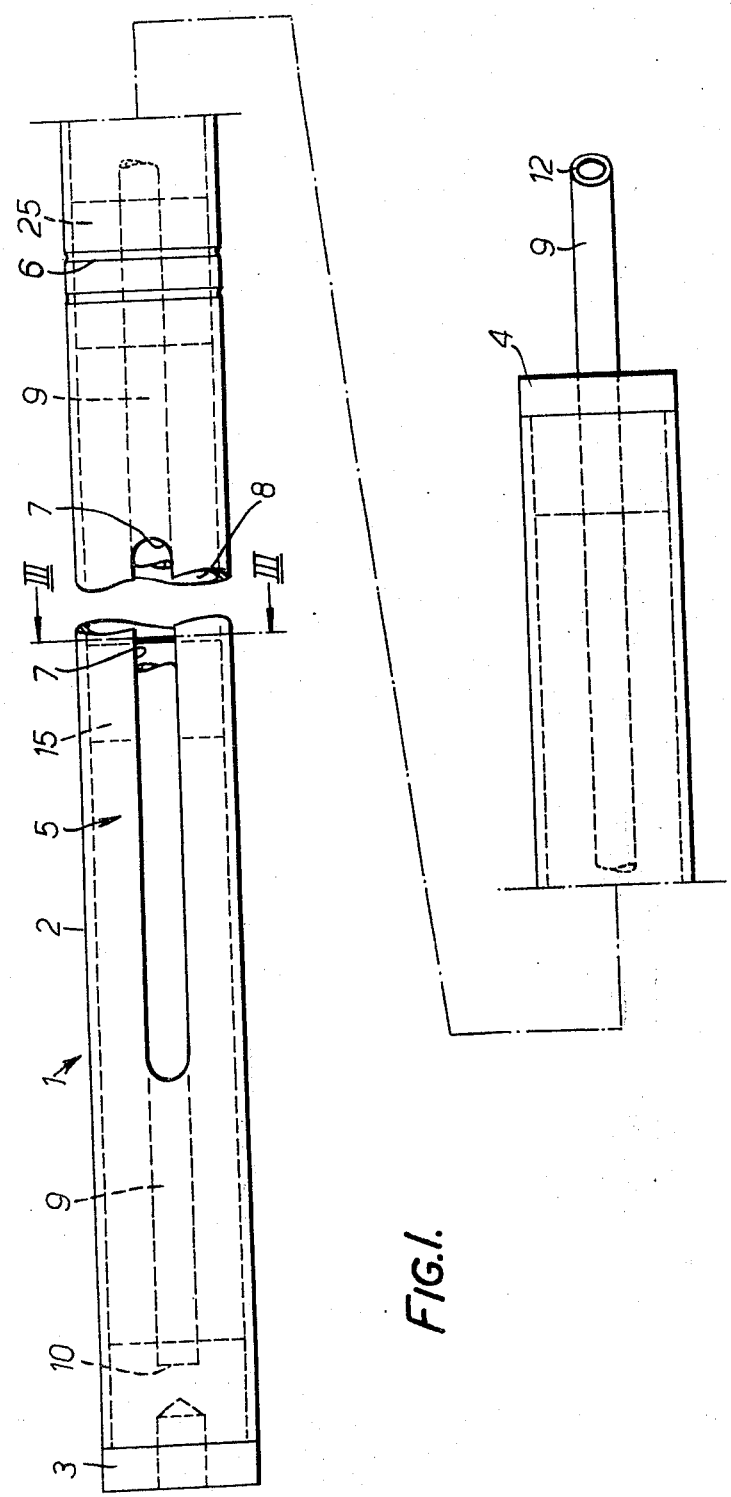

United States Patent [19]
Cutler

[11] 3,978,728
[45] Sept. 7, 1976

[54] FLUID FLOW MEASURING DEVICES
[75] Inventor: George Donald Cutler, Weymouth, England
[73] Assignee: Dover Corporation, New York, N.Y.
[22] Filed: Apr. 10, 1975
[21] Appl. No.: 566,726

[52] U.S. Cl. .................................................. 73/212
[51] Int. Cl.² .......................................... G01F 1/46
[58] Field of Search ................................... 73/212

[56] References Cited
UNITED STATES PATENTS

| 1,110,023 | 9/1914 | Wilkinson | 73/212 |
|---|---|---|---|
| 1,119,581 | 12/1914 | Dodge | 73/212 |
| 2,343,282 | 3/1944 | Daiber | 73/212 |
| 3,581,565 | 6/1971 | Dieterich | 73/212 |
| 3,751,982 | 8/1973 | Lambert | 73/212 |

OTHER PUBLICATIONS
Dwyer Co. Bulletin No. b-12, 1958.

Primary Examiner—Herbert Goldstein
Attorney, Agent, or Firm—Edwin L. Spangler, Jr.

[57] ABSTRACT

The invention forming the subject matter hereof comprises a flow measuring device for use in fluid-carrying conduits characterized by an elongate housing member including a longitudinally-extending slot communicating the interior thereof and opening upstream, a first tubular impact probe mounted within the housing and having a port in the wall thereof opening in a direction other than toward the slot in the latter, and a second tubular suction probe mounted inside the housing alongside the impact probe, the suction probe also including a port in the wall thereof facing downstream.

4 Claims, 3 Drawing Figures

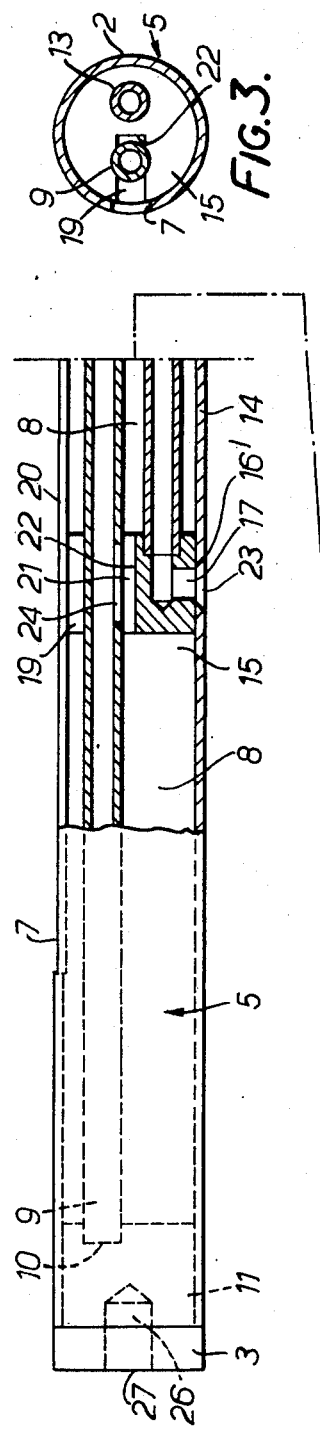
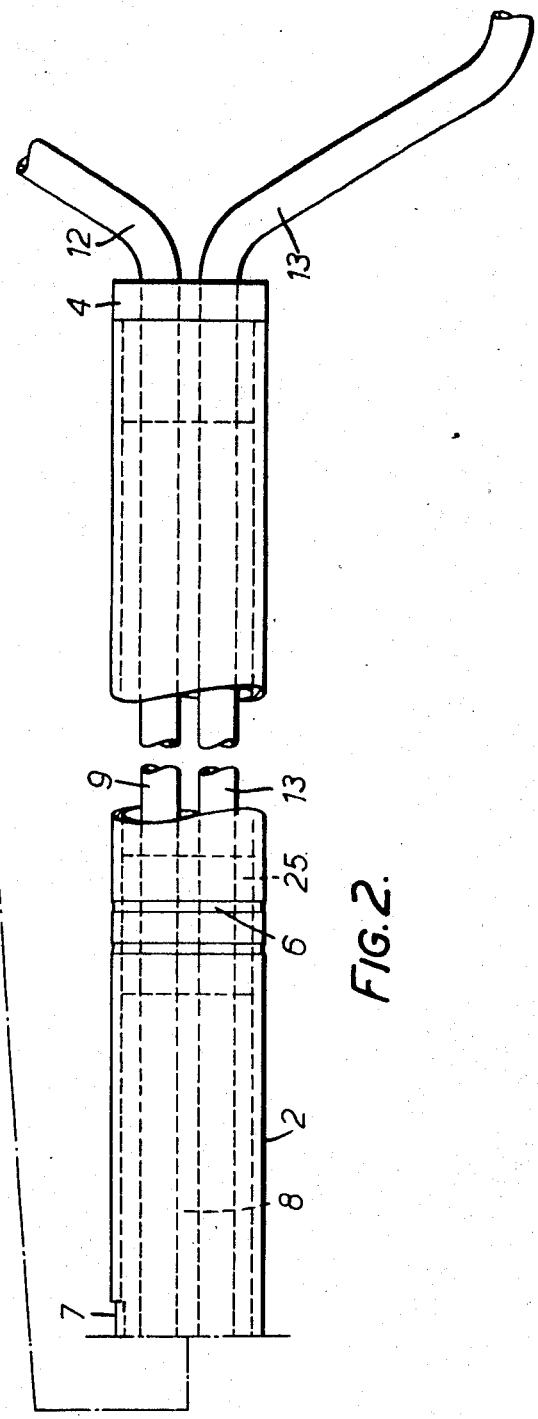

FLUID FLOW MEASURING DEVICES

This invention relates to devices for measuring the flow of fluid within conduit systems, and is particularly concerned with a device comprising at least means for measuring pressure of the fluid at a high pressure point and at a low pressure point, which means are usually connected to a pressure differential measuring instrument, such that the velocity of the flowing fluid may be calculated as a function of the recorded pressure differential.

The recordal of a pressure differential between a relatively high pressure point and a relatively low pressure point in a flowing fluid is a well known manner of measuring the velocity of the flowing fluid. For instance, it is accepted in the art to measure the pressure differential between the high pressure point at an orifice in a plate which, but for the orifice, substantially blocks the flow of the fluid in a conduit, and a relatively low pressure point at a location in the flowing fluid further downstream. Although the location of the orifice in the plate is not critical, restriction of the flow of fluid may produce a serious source of error in flow rate calculations. Furthermore, because the plate substantially blocks the flow of the fluid, any foreign object in the fluid, as well as the fluid itself, may only pass by way of the orifice in the plate. It is quite probable therefore, that the geometry of the orifice will vary substantially throughout its life due to wear caused by the fluid and by passing foreign objects. The orifice may also easily become partially blocked by a relatively large object.

Flow measuring devices which allow the flowing fluid to pass around them, are also well known, and include the Pitot tube. One form of the Pitot tube comprises a plurality of first ports in the side of an upstream facing tubular probe, which first ports are intended to open in a substantially normal direction to the flow of the fluid, and a second port which is intended to face upstream in the flowing fluid to measure its impact pressure. The first ports are intended to measure the static pressure transversely to the flow of the fluid, and communicate with the second port solely through a pressure differential measuring instrument.

It is known that any flow front contains fluid moving at different relative velocities. Bearing this in mind, it may be necessary, when using a Pitot type of flow measuring device, to obtain an average measurement of the flow rate across the flow front, by recording differential pressures as above described at various points transversely across the flow front, and averaging the sum of the differential pressures.

Improvements to Pitot flow measuring devices include locating the first port in a tubular probe such that it faces directly away from the second port. In this embodiment of the Pitot tube the second port should face upstream and measures the impact pressure of the fluid when the tube is located in the flowing fluid, and the first port should face downstream in the flowing fluid, such that it measures suction pressure of the fluid. The differential pressure between the impact pressure and the suction pressure under known conditions will usually be greater, and should therefore give more accurate flow rate measurements, than the differential pressure between the impact pressure and the static pressure under similar conditions. This second embodiment of the Pitot tube, however, possesses similar disadvantages to the first embodiment, in that it may be necessary to record a series of differential pressures across the flow front and to average these, in order to obtain a relatively accurate flow rate reading. In order to simplify the averaging of this plurality of different pressures, a method has been mathematically devised whereby the measurements of differential pressures are taken within various predetermined areas across the flow front.

The difficulty of accurately positioning the second port within each predetermined area across the flow front where each differential pressure measurement, has been partially overcome by providing a housing member having a plurality of openings along its length; the housing member being intended to be placed transversely to the flow front, and wherein the openings are positioned on the housing member in such a way that when the latter is correctly placed across the flow front, each of the plurality of openings is positioned within one of the said mathematically predetermined areas. Each of the plurality of openings may communicate independently with the pressure differential measuring instrument, such that each opening acts independently as a second port to measure the impact pressure within its predetermined area, in which case each opening will probably have a corresponding first port facing downstream and communicating with the former through the pressure differential measuring instrument.

Alternatively, each of the openings may open into a single chamber within the housing member, such that the overall fluid pressure within the latter is an approximate average of the impact pressure at each of the openings. In this embodiment of the prior art, there is usually provided a second port within the housing member, and suitably located therein to measure the average pressure within the housing member. The second port will communicate as previously with the pressure differential measuring instrument. There will generally be one first port located opposite to and facing away from the second port, which first port will also communicate with the pressure differential measuring instrument, for measurement of the suction pressure of the flowing fluid.

A flow measuring device as generally embodied in the immediately preceding paragraph is described in the specification of U.K. Pat. No. 1,229,536. If the flow profile of the fluid in the conduit is not symmetrical, then there is a possibility of secondary flow within the housing member transversely to the general direction of flow of the fluid within the conduit. This secondary flow may promote turbulence within the housing member and thus impair the accuracy of the pressure differential recordings.

It is an object of the present invention to improve the accuracy of the pressure differential recordings when the flow profile of the fluid in the conduit is not symmetrical.

According to the present invention there is provided a flow measuring device, locatable within a conduit carrying a flowing fluid, said device comprising a tubular impact probe mounted within a chamber of an elongate housing member, and a tubular suction probe, said tubular probes being intended for connection at one of their respective ends to a pressure sensing device located externally to the conduit; the passage of the suction probe communicating with a first port which is intended to be in the fluid flow and to face downstream when the device is located within the conduit; the passage of the impact probe communicating through a second port with the chamber of the housing member; the housing member having a slot in the wall thereof, which slot communicates with the chamber and extends longitudinally along the housing member and is intended to be in the fluid flow and to face upstream when the device is located within the conduit, and wherein said second port is located at a position in which it does not open towards the slot.

Preferably, but not essentially, the housing member should be of a substantially cylindrical profile, and conveniently the suction probe may be located within the chamber of the housing member. In this instance the suction probe should be located on the side of the impact probe remote from the slot, and the first port should communicate with the flowing fluid solely through a mouth in the side of the housing member remote from the slot.

Hitherto, it has generally been a problem of flow measuring devices, that there is a difficulty in accurately assessing in what position across the flow front the plurality of openings, or the second port are located. In the preferred embodiment of the present invention the problem is substantially alleviated since the housing member is preferably intended to extend across a full diagonal of the flow front. When this is the case the "feel" of the end of the housing member within the conduit abutting against an interior wall of said conduit will insure that the housing member is fully extending across the flow front.

In order to allow further assurance that the housing member is correctly located across the flow front, means may be provided on the exterior side of the housing member, which means are intended to indicate a limit of that part length of the housing member which is intended to project into the conduit.

Generally, the longitudinally extending slot in the housing member will lie in the aforementioned part-length and preferably equidistant between that end of the housing member which is intended to be in the fluid flow, and the indicating means described in the immediately preceding paragraph. Further, the slot will generally extend between 55% and 85%, but preferably 60%, of the aforementioned part-length of the housing member.

In the preferred embodiment of the invention, the slot lies equidistant between the limits of the part-length as previously described, and the first and second ports of the suction probe and impact probe respectively, should preferably lie on a line which passes centrally through the slot and extends substantially parallel with the overall flow of the fluid. Furthermore, preferably the impact probe should extend the full length of the chamber of the housing member.

The width of the slot will generally lie in the range 1 mm – 2 mms, and will preferably be 1 mm.

One embodiment of the present invention will now be described, by way of example only, with reference to the accompanying illustrative drawings in which:

FIG. 1 shows an exploded front elevation of a flow measuring device in accordance with the invention, FIG. 2 shows an exploded side elevation of the device shown in FIG. 1, and includes part section of the device, and part section of the device, and FIG. 3 shows a plan section of the device taken on the line III — III of FIG. 1.

The flow measuring device shown generally at 1 in FIG. 1 comprises an elongate cylindrical housing member 2 having two end plugs, 3 and 4 respectively, which end plugs seal the respective ends of the housing member. On the exterior side wall 5 of the housing member 2 there is provided means 6, which means may comprise, for example, an etched line or a ring about the circumference of the housing member, to indicate the part length A (shown in FIG. 2) of the housing member 2 which is intended to project into the conduit (not shown) in which the fluid is flowing. In the wall 5 of the housing member 2 between the indicating means 6 and that end 3 of the housing member which is intended to be in the fluid flow, there is provided a longitudinally extending slot 7 which opens into a chamber 8 within the cylindrical housing member, and which slot 7 is intended to face towards the fluid flow. The slot 7 in the embodiment shown lies centrally between the aforementioned indicating means 6 and the end 3 of the housing member, and extends along 60% of the part-length A. Within the chamber 8 and extending the full length thereof, there is tubular impact probe 9 which lies downstream of the slot 7, when the device 1 is located in the fluid flow. The impact probe 9 is blind at the end which is intended to be in the fluid flow, sealingly terminating in a recess 10 in the plug-part 11 of the end plug 3. The other end 12 of the impact probe 9 extends through the end plug 4 of the housing member, to allow communication with a pressure differential measuring instrument (not shown).

A tubular suction probe 13 is located downstream of the impact probe and is therefore more easily seen in FIG. 2. The suction probe 13 has one end 14 which is located in a support member 15, and which communicates via the passages 16 and 17 in the support member 15 with a mouth 18 in the wall 5 of the housing member 2. The mouth 18 opens in the opposite direction to the slot 7 and is therefore intended to face downstream when the device is in the fluid flow; the mouth 18 therefore acts as a first port 23 which is intended to enable measurement of the suction pressure of the flowing fluid. The other end of the suction probe 13 extends through the end-plug 4 of the housing member to allow communication with the pressure differential measuring instrument.

The part section of FIG. 2 further shows that the support member 15 provides support for the impact probe 9 as well as the suction probe 13, as may be more clearly seen in FIG. 3. The impact probe 9 passes through a longitudinally extending channel 19 in the support member 15, wherein the channel 19 is located so that it opens into the slot 7 in the housing member 2, and therefore directly receives some of the impact pressure of the flowing fluid. Furthermore, the channel 19 extends laterally beyond the periphery 20 of the impact probe 9, such that there is a duct 21 extending longitudinally between the said periphery 20 and the end 22 of the channel 19.

On the side of the impact probe 9 remote from the slot 7, and within the length of the duct 21, there is located a second port 24 which is provided to allow measurement of the impact pressure of the fluid. Both the first and second ports lie on a laterally extending axis, which may be taken through the centre of the slot. The first and second ports 23 and 24 respectively will generally lie on the same axis — i.e. the same distance from either end 3 or 4 of the housing member 2 — so that there should be minimal static pressure when there is no flow of the fluid.

The housing member 2 is intended to be located across the flow front, with the slot 7 opening upstream, and therefore the first and second ports 23 and 24 respectively, open downstream. Fluid enters and fills the chamber 8 through the slot 7 and fluid pressure builds up within the chamber. Fluid within the chamber enters the impact probe 9 through the second port 24 and the impact pressure of the fluid may be measured, from the impact probe, by a pressure measuring instrument such as a manometer (not shown). Fluid within the conduit but external to the housing member 2 is able to flow around the latter, and the suction pressure of the fluid passing the downstream-facing mouth 18 of the first port 23 communicates with the pressure measuring instrument through the suction probe 13. The pressure measuring instrument records the pressure differential between the impact pressure taken at the second port 24 and the suction pressure taken at the first port 23, which pressure differential may be used in a series of calculations to find the flow rate of the fluid.

The support member 15, and a further one 25 are intended to provide some rigidity to the impact probe 9 and the suction probe 13 which might otherwise vibrate under the impact pressure of the flowing fluid. The support member 25 provides a seal to the chamber 8 and to retain this seal, the impact probe 9 and the suction probe 13 are preferably not moveable with respect to the housing member.

A bore 26 is provided in the end face 27 of the end plug 3 to be able to cooperate with a pin (not shown) which may be located on the inner wall of the conduit. In cooperation the bore 26 and the pin may further aid proper location of the housing member 2 within the conduit and may minimise small movements of the housing member under the impact pressure of the flowing fluid, which movements, if present, may case local turbulence within the fluid.

What I claim is:

1. In a fluid flow measuring device of the type having an elongate housing member defining a chamber, means defining an aperture in the wall of the housing member opening into the interior thereof positionable in the fluid flow facing upstream, a first tubular probe member mounted in said chamber and having a port connecting the interior thereof with said chamber, and a second tubular probe member having a port opening opposite to the housing member aperture for sensing the suction of the flow impinging against the latter, the improvement in which the aperture defining means comprises an elongate slot extending longitudinally of said housing member opening in a direction opposite the port in the first tubular member.

2. A device according to claim 1, wherein said second tubular probe member is mounted in said chamber and said housing member has means defining a second aperture diametrically opposite said slot, said port of said second tubular probe member communicating with the fluid flow through said second aperture.

3. A device according to claim 2, wherein a support is positioned in said chamber supporting said tubular members, said support having a passageway therein connecting the interior of said second tubular member with the second aperture in said housing member.

4. A device according to claim 3, wherein the support includes an opening extending longitudinally thereof positioned and adapted to receive the first tubular member and leave a channel open at both ends communicating the interior thereof through the port therein.

* * * * *